United States Patent
Ende et al.

(10) Patent No.: US 11,247,339 B2
(45) Date of Patent: Feb. 15, 2022

(54) DEVICE AND METHOD FOR PLUGGING AN EXPANSION BOARD INTO A PLUG-IN COUPLING

(71) Applicant: Franka Emika GmbH, Munich (DE)

(72) Inventors: Tobias Ende, Munich (DE); Michael Haas, Todtenweis-Sand (DE); Saskia Golz, Munich (DE); Sven Parusel, Munich (DE); Simon Haddadin, Munich (DE)

(73) Assignee: Franka Emika GmbH, Munich (DE)

( * ) Notice: Subject to any disclaimer, the term of this patent is extended or adjusted under 35 U.S.C. 154(b) by 264 days.

(21) Appl. No.: 16/606,989

(22) PCT Filed: Apr. 18, 2018

(86) PCT No.: PCT/EP2018/059855
§ 371 (c)(1),
(2) Date: Oct. 21, 2019

(87) PCT Pub. No.: WO2018/197289
PCT Pub. Date: Nov. 1, 2018

(65) Prior Publication Data
US 2021/0101284 A1    Apr. 8, 2021

(30) Foreign Application Priority Data

Apr. 23, 2017   (DE) .................. 10 2017 003 913.5

(51) Int. Cl.
*B25J 9/16*      (2006.01)
*B25J 9/00*      (2006.01)

(52) U.S. Cl.
CPC .......... *B25J 9/1687* (2013.01); *B25J 9/0081* (2013.01); *B25J 9/1633* (2013.01); *B25J 9/1669* (2013.01);
(Continued)

(58) Field of Classification Search
CPC ...... B25J 9/1687; B25J 9/0081; B25J 9/1633; B25J 9/1669; B25J 9/1679; B25J 9/1602;
(Continued)

(56) References Cited

U.S. PATENT DOCUMENTS

| 4,610,082 A | 9/1986 | Anderson |
| 5,206,930 A | 4/1993 | Ishikawa et al. |

(Continued)

FOREIGN PATENT DOCUMENTS

| JP | 62-124837 A | 6/1987 |
| JP | 01-234183 A | 9/1989 |

(Continued)

OTHER PUBLICATIONS

English Translation of the International Preliminary Report on Patentability issued in International Application No. PCT/EP2018/059855 dated Nov. 7, 2019.

(Continued)

*Primary Examiner* — Basil T. Jos
(74) *Attorney, Agent, or Firm* — Hoffmann & Baron, LLP

(57) ABSTRACT

Device for plugging a plug-in region of an expansion board into a plug-in coupling including: a first interface providing the coupling; a second interface providing the board; a robot manipulator having an effector; and a controller controlling the robot manipulator to plug the region into the coupling, the controller configured to execute a program for the robot manipulator to perform operations including: picking up the board at the second interface using the effector; guiding the board along a trajectory and target orientation of the region to the coupling; carrying out tilting motions of the region until reaching or exceeding a limit value condition G1 for a torque acting on the effector and/or a limit value condition G2 of a force acting on the effector, and/or reaching or exceeding a force/torque signature and/or a position/veloc- (Continued)

ity/acceleration signature at the effector, indicating completion of plugging the region into the coupling within predefined tolerances.

16 Claims, 1 Drawing Sheet

(52) U.S. Cl.
CPC .............. *G05B 2219/39129* (2013.01); *G05B 2219/40082* (2013.01)

(58) Field of Classification Search
CPC ......... B25J 9/1612; G05B 2219/39129; G05B 2219/40082
See application file for complete search history.

(56) References Cited

U.S. PATENT DOCUMENTS

| 2013/0310977 A1* | 11/2013 | Tsusaka | B25J 9/163 700/257 |
| 2014/0114477 A1 | 4/2014 | Sato et al. | |

FOREIGN PATENT DOCUMENTS

| JP | 06-020744 A | 1/1994 |
| JP | 08-216080 A | 8/1996 |
| JP | 2011-194499 A | 10/2011 |
| JP | 2013-99801 A | 5/2013 |
| JP | 2015-168017 A | 9/2015 |
| KR | 1020130015818 A | 2/2013 |
| WO | WO 2009/057416 A2 | 5/2009 |
| WO | WO 2011/153156 A2 | 12/2011 |
| WO | WO 2013/080500 A1 | 6/2013 |

OTHER PUBLICATIONS

English-language translation of Reason of Rejection (Summary) of the Office Action issued in Japanese Publication No. 2019-557562 dated Jan. 5, 2021.

English-language translation of Summary of the Office Action issued in Korean Application No. 10-2019-7034405 dated Feb. 17, 2021.

* cited by examiner

DEVICE AND METHOD FOR PLUGGING AN EXPANSION BOARD INTO A PLUG-IN COUPLING

CROSS-REFERENCE TO RELATED APPLICATIONS

The present application is the U.S. National Phase of PCT/EP2018/059855, filed on 18 Apr. 2018, which claims priority to German Patent Application No. 10 2017 003 913.5, filed on 23 Apr. 2017, the entire contents of which are incorporated herein by reference.

BACKGROUND

Field

The invention relates to a device and to a method for plugging an expansion board into a plug-in coupling.

Related Art

Expansion boards, particularly electronic expansion boards, are frequently detachably, securely connected to other electronic components via so-called plug connectors. The connecting parts (plug-in region of the expansion board, plug-in coupling) in this case are typically suitably aligned to one other by form-fitting and detachably affixed by force-fitting. Optionally, the expansion board and plug-in coupling are screwed together, which secures against unintentional loosening of the plug connection.

The term "expansion board" here is understood to be broadly formulated. It essentially includes all objects which have a plug-in region, which can be plugged into a plug-in coupling.

SUMMARY

The object of the invention is to indicate a device and a method for plugging an expansion board into a plug-in coupling such that an effective automated and reliable plugging of the expansion card into the plug-in coupling is possible.

The invention results from the features of the main claims. Advantageous further embodiments and designs are the subject matter of the dependent claims. Further features, application options, and advantages of the invention result from the following description, and explanation of example embodiments of the invention, which are represented in the figures.

A first aspect of the invention relates to a device for plugging a plug-in region of an expansion board into a plug-in coupling, the plug-in coupling having a slot, which has a depth T along a depth axis TA, a width B along a width axis BA, and a length L along a longitudinal axis LA, wherein the plug-in region of the expansion board is dimensioned such that it can be plugged completely into the slot, and wherein the depth axis TA and the longitudinal axis LA define a plug-in plane. The proposed device includes a first interface for providing the plug-in coupling; a second interface for providing the expansion board; a first robot manipulator having an effector, which is designed and configured to pick up, handle, and release the expansion board; and a control unit for the open-loop/closed-loop control of the first robot manipulator, the control unit being configured and designed to execute a control program having the following steps: the first robot manipulator picks up the expansion board at/from the second interface using the effector and guides the expansion board along a specified trajectory T with a specified target orientation $O_{target}(R_T)$ of the plug-in region to the plug-in coupling provided at the first interface, wherein $O_{target}(R_T)$ defines the target orientation of the plug-in region of the expansion board held by the effector along the trajectory T for locations $R_T$ of the trajectory T, wherein, in order to plug the plug-in region into the plug-in coupling using the first robot manipulator, force-controlled and/or impedance-controlled and/or admittance-controlled tilting motions of the plug-in region in the plug-in plane are carried out until a specified limit value condition G1 for a torque acting on the effector and/or a specified limit value condition G2 of a force acting on the effector is reached or exceeded and/or a provided force/torque signature and/or a position/velocity/acceleration signature is reached or exceeded at the effector, which indicates/indicate that the plugging of the plug-in region into the plug-in coupling is successfully completed within predefined tolerances.

The control program is specialized for the particular application using correspondingly predefined open-loop and closed-loop control parameters. Thus, by changing the control program and/or the assigned open-loop and closed-loop control parameters, corresponding adaptations of the device can be carried out based on special applications.

The first interface for providing the plug-in coupling may be a conveyor belt, a robot, a robot manipulator, a device in which the plug-in coupling is clamped, a conveyor, an isolation system for plug-in couplings, etc. Advantageously, the plug-in coupling is a direct plug connector and/or a so-called card-edge connector.

The second interface for providing the expansion board may be a conveyor belt, a robot, a robot manipulator, a chute, an isolation system for expansion boards, etc.

The plug-in region of the expansion board is advantageously designed substantially square-shaped, wherein the three edge lengths (width b, length l, height h) defining the square have different values, wherein b<h<l. Electrical contacts are typically arranged on two opposing surfaces of the plug-in region, said electrical contacts having corresponding electrical contact with electrical contacts found in the plug-in region when it is plugged into the slot of the plug-in coupling.

Knowledge upon which the invention is based is that, due to the utilization of a lever action, the force required when the plugging of the plug-in region into the slot of the plug-in coupling is executed with the proposed tilting motions is less than the force required when the plugging of the plug-in region is done with a pure translational motion. Due to the proposed tilting motions in the plug-in plane, the force to be applied by the robot and/or robot manipulator is thus reduced, simultaneously the loading of the expansion board and the plug-in coupling is likewise correspondingly reduced when connecting. As a whole, the plug connection thus takes place with more energy-savings and material protection than in the prior art.

The tilting motions in the plug-in plane are preferably periodic and continual. In an alternative embodiment, the tilting motions in the plug-in plane take place progressively in succession, i.e., the plug-in region is "jiggled into" the slot of the plug connection. In addition to the tilting motions, superposed translational motions, which cause the plug-in region to be guided into the plug-in coupling with the execution of tilting motions, are advantageously also carried out by the first robot manipulator.

The term "signature" is understood here to be the characteristic of the force and/or torque signals recorded on the effector. This can be based on individual values or time series and values derived therefrom of the recorded forces and/or torques.

Advantageously, the force-controlled and/or impedance-controlled and/or admittance-controlled tilting motions in the plug-in plane take place relative to the target orientation $O_{target}(R_T)$ of the plug-in region with maximum tilt angles in a range of from ±2° to ±30°.

Advantageously, the plug-in region and the plug-in coupling have electrical contacts spatially assigned to one another, which have corresponding electrical contact when the plug-in region is completely plugged into the slot-shaped plug-in coupling.

The expansion board is advantageously a computer main board, a computer memory module (RAM, ROM, EPROM, EEPROM, SSD, DRAM, SDRAM, DDR-SDRAM, flash memory, FRAM, MRAM, PCRAM, etc.), a computer expansion board, graphics card, sound card, network card, fax card, PCI card, PCI-X card, PCI-E card, ISA card, MCA card, an EISA card, AGP card, VESA local bus card, or a processor card. This list is obviously not exhaustive. In fact, all plug connections in which a plug-in region of an expansion board must be introduced into a slot of a plug-in coupling are included in the concept of the invention.

An advantageous further embodiment of the proposed device is characterized in that the control unit is configured and designed to execute the following control program: control of the first robot manipulator such that the effector releases the expansion board after a successfully completed plugging of the plug-in region into the plug-in coupling and the effector executes force-controlled and/or impedance-controlled and/or admittance-controlled rotational and/or tilting motions and/or translational motion patterns relative to the expansion board in order to release the expansion board.

The rotational and/or tilting motions are advantageously periodic and/or closed motions, which are executed continually or progressively, for the entire description in this case. Alternatively, aperiodic motions or a mixture of aperiodic motions and periodic motions are possible depending on the application.

Advantageously, the first interface is a second robot manipulator with an effector, which is designed and configured to pick up, handle, and release the plug-in coupling. Advantageously, the second robot manipulator extracts a plug-in coupling from a reservoir, respectively, and provides the plug-in coupling in a predefined position with a predefined orientation.

In some application cases, the plug-in coupling is already securely connected to a further component (for example, an electronic board) upon its provision at the first interface such that the respective electronic component with the first interface is provided on the first interface. The provision of the plug-in coupling on the first interface is thus understood within the scope of the entire disclosure including to the extent that a combination of a plug-in coupling with a part securely connected thereto can also be provided.

An advantageous further embodiment of the device is characterized in that the device has a data interface to a data network (e.g. Internet, LAN, local area network), and the device is designed and configured to load control programs from the data network. Advantageously, the device has a data interface as well as a corresponding program memory for this. Advantageously, the control programs are made available in the respective data network by a central provider. The data network is advantageously a wired data network, a wireless data network, or a combination thereof.

Advantageously, the device is designed and configured to load open-loop and closed-loop control parameters to the control programs from the data network. The open-loop and closed-loop control parameters define the specific application of the corresponding control program. The open-loop and closed-loop parameters are particularly adapted to the task to be achieved (for example to the plug-in coupling and the plug-in region of the expansion board). Advantageously, the device has a corresponding data memory for this.

Advantageously, the device is designed and configured to load open-loop and closed-loop control parameters to the control programs via a manual input interface of the device (for example, a human-machine interface available in the area of the device) and/or via a teach-in process, in which the robot manipulator is guided manually, i.e., is moved by a user through the application of a force. Furthermore, both the manual input interface and a teach-in process carried out with the robot manipulator enable a correction and/or adaptation of open-loop and closed-loop control parameters loaded from the data network.

Advantageously, the device is designed and configured such that the loading of control programs and/or of related open-loop and closed-loop control parameters from the data network is controlled by a remote station, which is likewise connected to the data network. Such remote stations may be, for example, tablets, smart phones, notebooks, personal computers, etc. Advantageously, a remote station is operated by a central provider.

Advantageously, the device is designed and configured to send control programs and/or open-loop and closed-loop control parameters locally available on the device to other users in the data network upon a request from a user in the data network and/or autonomously, for example when a predefined condition is present. Such a "user" may be essentially any computing and/or memory unit configured for this data exchange.

Advantageously, the device is designed and configured to start control programs loaded locally on the screwing device with the corresponding open-loop and closed-loop control parameters from a remote station, which is likewise connected to the data network. Such remote stations may be, for example, tablets, smart phones, notebooks, personal computers, etc. Advantageously, a remote station is operated by a central provider.

Advantageously, the remote station and/or the manual input interface on the device has a human-machine interface, which is designed and configured for the input of control programs and/or related open-loop and closed-loop control parameters, and/or for the selection of control programs and/or related open-loop and closed-loop control parameters from a plurality of available control programs and/or related open-loop and closed-loop control parameters.

Advantageously, the human-machine interface enables inputs via a drag-and-drop input on a touchscreen, a guided input dialogue, a keyboard, a computer mouse, a haptic input interface, virtual-reality glasses, an acoustic input interface, body tracking, on the basis of electromyography data, on the basis of electroencephalography data, via a neuronal interface to the brain of the operator, or combinations thereof.

Advantageously, the human-machine interface is designed and configured for outputting audiovisual, haptic, olfactory, tactile, electrical feedback, or a combination thereof.

A further aspect of the invention relates to a method for plugging a plug-in region of an expansion board into a plug-in coupling, the plug-in coupling having a slot, which has a depth T along a depth axis TA, a width B along a width axis BA, and a length L along a longitudinal axis LA, wherein the plug-in region of the expansion board is dimensioned such that it can be plugged completely into the slot, and the depth axis TA and the longitudinal axis LA define a plug-in plane. The proposed method includes the following steps: provision of the plug-in coupling at a first interface; provision of the expansion board at a second interface; open-loop/closed-loop control of a first robot manipulator having an effector, which is designed and configured to pick up, handle, and release the expansion board such that the first robot manipulator picks up the expansion board from the second interface using the effector and guides the expansion board along a specified trajectory T with a specified target orientation $O_{target}(R_T)$ of the plug-in region to the plug-in coupling provided at the first interface, wherein $O_{target}(R_T)$ defines the target orientation of the plug-in region along the trajectory T for locations $R_T$ of the trajectory T; wherein, in order to plug the plug-in region into the plug-in coupling using the first robot manipulator, force-controlled and/or impedance-controlled and/or admittance-controlled tilting motions of the plug-in region in the plug-in plane are carried out until a specified limit value condition G1 for a torque acting on the effector and/or a specified limit value condition G2 of a force acting on the effector is reached or exceeded and/or a provided force/torque signature and/or a position/velocity/acceleration signature is reached or exceeded at the effector, which indicates/indicate that the plugging of the plug-in region into the plug-in coupling is successfully completed within predefined tolerances.

Advantageously, the force-controlled and/or impedance-controlled and/or admittance-controlled tilting motions take place relative to the target orientation $O_{target}(R_T)$ of the plug-in region with maximum tilt angles in the plug-in plane in a range of from ±2° to ±30°. Advantageously, the effector releases the expansion board after a successfully completed plugging of the plug-in region into the plug-in coupling, wherein the first robot manipulator is open-loop/closed-loop controlled such that its effector executes force-controlled and/or impedance-controlled and/or admittance-controlled periodic rotational and/or tilting motions and/or translational motion patterns relative to the expansion board in order to release the expansion board. Motions occur advantageously only for a short time and lead to a quick release of the effector from the expansion board.

An advantageous further embodiment of the method is characterized in that the respective device has a data interface to a data network, and the device is designed and configured to load one or more control programs from the data network.

An advantageous further embodiment of the method is characterized in that the respective device loads open-loop and closed-loop control parameters to the control programs from the data network.

An advantageous further embodiment of the method is characterized in that the respective device loads open-loop and closed-loop control parameters to the control programs available locally on the device via a local input interface and/or via a teach-in process, in which the first and/or second or third robot manipulator is guided manually.

An advantageous further embodiment of the method is characterized in that the loading of control programs and/or of related open-loop and closed-loop control parameters from the data network to the respective device is controlled by a remote station, which is likewise connected to the data network.

An advantageous further embodiment of the method is characterized in that control programs available locally on the device with the related open-loop and closed-loop control parameters are started by a remote station, which is likewise connected to the data network.

Advantages and advantageous further embodiments of the method as well as explanations regarding same result from an analogous and corresponding transfer of the statements previously made regarding the proposed device.

A further aspect of the invention relates to a computer system with a data processing device, wherein the data processing device is designed such that method, as previously indicated, is executed on the data processing device.

A further aspect of the invention relates to a digital memory medium with electronically readable control signals, wherein the control signals can cooperate with a programmable computer system such that a previously indicated method is executed.

A further aspect of the invention relates to a computer program product with a memory code, stored on a machine-readable carrier, for executing the method, as previously indicated, when the program code is implemented on a data processing device.

A further aspect of the invention relates to a computer program with memory codes for executing the method, as previously indicated, when the program is running on a data processing device. To this end, the data processing device may be designed as any computer system known from the prior art.

Other advantages, features, and details result from the following description, in which at least one example embodiment is described in detail—optionally with reference to the drawings. Equivalent, similar, and/or functionally equivalent parts have been given the same reference numerals.

DETAILED DESCRIPTION

Figure 1:
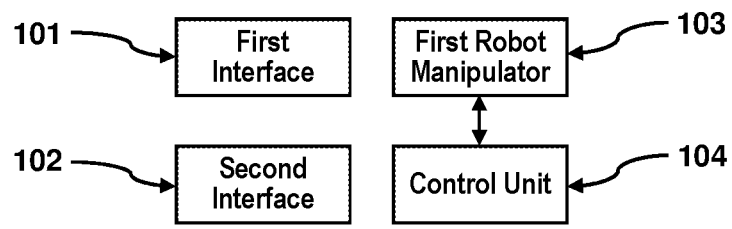
FIG. 1 shows a highly schematic construction of a proposed device.

FIG. 1 shows a highly schematic construction of a proposed device for plugging a plug-in region of an expansion board into a plug-in coupling, the plug-in coupling having a slot, which has a depth T along a depth axis TA and a length L along a longitudinal axis LA, wherein the plug-in region of the expansion board is dimensioned such that it can be plugged completely into the slot, and wherein the depth axis TA and the longitudinal axis LA define a plug-in plane. The device includes a first interface 101 for providing the plug-in coupling, which is a mechanical clamping device on a tabletop in this case, in which the plug-in coupling is provided. Furthermore, the device includes a second interface 102 for providing the expansion board, which is a conveyor belt in this case, on which the expansion board is provided in a particular position and orientation. Furthermore, the device includes a first robot manipulator 103 with an effector, which is designed and configured to pick up, handle, and release the expansion board, and a control unit 104 for open-loop/closed-loop control of the first robot manipulator 103.

The control unit 104 includes a processor unit and a control program running thereon, wherein the control unit 104 is configured and designed to execute the following steps of the control program. In one step, the first robot manipulator 103 picks up the expansion board on/from the second interface 102 using the effector and guides the expansion board along a specified trajectory T with a specified target orientation $O_{target}(R_T)$ of the plug-in region to the plug-in coupling provided at the first interface, wherein $O_{target}(R_T)$ defines the target orientation of the plug-in region of the expansion board held by the effector along the trajectory T for locations $R_T$ of the trajectory T. In order to plug the plug-in region into the plug-in coupling using the first robot manipulator 103, force-controlled and/or impedance-controlled and/or admittance-controlled tilting motions of the plug-in region in the plug-in plane are carried out until a specified limit value condition G1 for a torque acting on the effector and a specified limit value condition G2 of a force acting on the effector is reached or exceeded, which indicate that the plugging of the plug-in region into the plug-in coupling is successfully completed within predefined tolerances. The translational motions, which guide the plug-in region in the direction of the slot, are superposed on the force-controlled tilting motions.

Figure 2:
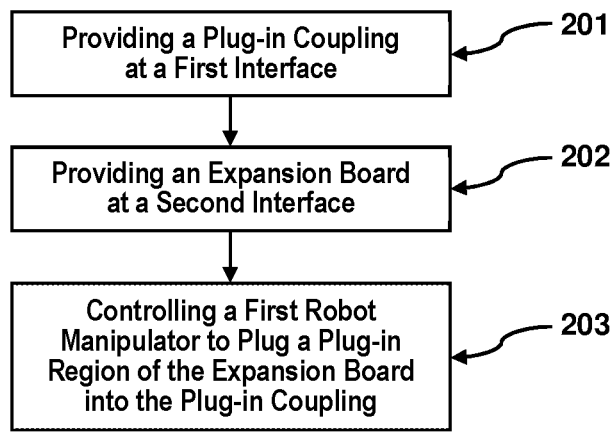
FIG. 2 shows a highly schematic flowchart of a proposed method.

FIG. 2 shows a highly schematic flowchart of a proposed method for plugging a plug-in region of an expansion board into a plug-in coupling, the plug-in coupling having a slot, which has a depth T along a depth axis TA, a width B along a width axis BA, and a length L along a longitudinal axis LA, wherein the plug-in region of the expansion board is dimensioned such that it can be plugged completely into the slot, and the depth axis TA and the longitudinal axis LA define a plug-in plane, with the following steps: provision 201 of the plug-in coupling at a first interface; provision 202 of the expansion board at a second interface; open-loop/closed-loop control 203 of a first robot manipulator having an effector, which is designed and configured to pick up, handle, and release the expansion board such that the first robot manipulator picks up the expansion board from the second interface using the effector and guides the expansion board along a specified trajectory T with a specified target orientation $O_{target}(R_T)$ of the plug-in region to the plug-in coupling provided at the first interface, wherein $O_{target}(R_T)$ defines the target orientation of the plug-in region along the trajectory T for locations $R_T$ of the trajectory T; wherein, in order to plug the plug-in region into the plug-in coupling using the first robot manipulator 104, force-controlled and/or impedance-controlled and/or admittance-controlled tilting motions of the plug-in region in the plug-in plane are carried out until a specified limit value condition G1 for a torque acting on the effector and/or a specified limit value condition G2 of a force acting on the effector is reached or exceeded and/or a provided force/torque signature and/or a position/velocity/acceleration signature is reached or exceeded at the effector, which indicates/indicate that the plugging of the plug-in region into the plug-in coupling is successfully completed within predefined tolerances.

Although the invention has been illustrated and explained in more detail using preferred example embodiments, the invention is not limited by the disclosed examples and other variations may be derived by one of ordinary skill in the art without extending beyond the protective scope of the invention. It is thus clear that a plurality of variation options exists. It is likewise clear that example embodiments actually only represent examples, which are not to be interpreted in any manner as a limitation, for example, of the protective scope, the use options, or the configuration of the invention.

In fact, the previous description and the description of figures should make one of ordinary skill in the art capable of specifically implementing the example embodiments, wherein one of ordinary skill in the art with knowledge of the disclosed concept of the invention can undertake various changes, for example, with respect to the function or the arrangement of individual elements listed in an example embodiment, without going beyond the scope of protection, which is defined by the claims and the legal equivalents thereof such as, for example, more extensive explanations in the description.

The invention claimed is:

1. A device for plugging a plug-in region of an expansion board into a plug-in coupling, the plug-in coupling having a slot, the slot having a depth T along a depth axis TA, a width B along a width axis BA, and a length L along a longitudinal axis LA, wherein the plug-in region of the expansion board is dimensioned such that it is capable of being plugged completely into the slot, and wherein the depth axis TA and the longitudinal axis LA define a plug-in plane, the device comprising:
a first interface to provide the plug-in coupling;
a second interface to provide the expansion board;
a first robot manipulator with an effector, the effector designed and configured to pick up, handle, and release the expansion board; and
a control unit for open-loop or closed-loop control of the first robot manipulator to plug the plug-in region of the expansion board into the plug-in coupling, the control unit configured and designed to execute a control program for the first robot manipulator (103) to perform operations comprising:
picking up the expansion board at/from the second interface using the effector;
guiding the expansion board along a specified trajectory T with a specified target orientation $O_{target}(R_T)$ of the plug-in region to the plug-in coupling provided at the first interface, wherein $O_{target}(R_T)$ defines the target orientation of the plug-in region of the expansion board held by the effector along the trajectory T for locations $R_T$ of the trajectory T; and
carrying out force-controlled and/or impedance-controlled and/or admittance-controlled tilting motions of the plug-in region in the plug-in plane until a specified limit value condition G1 for a torque acting on the effector and/or a specified limit value condition G2 of a force acting on the effector is reached or exceeded, and/or a provided force/torque signature and/or a position/velocity/acceleration signature is reached or exceeded at the effector, indicating that the plugging of the plug-in region into the plug-in coupling is successfully completed within predefined tolerances.

2. The device according to claim 1, wherein the force-controlled and/or impedance-controlled and/or admittance-controlled tilting motions in the plug-in plane take place relative to the target orientation $O_{target}(R_T)$ of the plug-in region with maximum tilt angles in a range of $\pm 2°$ to $\pm 30°$.

3. The device according to claim 2, wherein the maximum tilt angles are one or more of $\pm 3°$, $\pm 5°$, $\pm 7°$, $\pm 10°$, $\pm 15°$, $\pm 20°$, $\pm 25°$.

4. The device according to claim 1, wherein the plug-in coupling is a direct plug connector or card edge connector.

5. The device according to claim 1, wherein the plug-in region of the expansion board and the plug-in coupling have electrical contacts spatially assigned to one another, wherein the electrical contacts of the plug-in region and plug-in coupling have corresponding electrical contact when the plug-in region is completely plugged into the slot-shaped plug-in coupling.

6. The device according to claim 1, wherein the operations comprise controlling the first robot manipulator such that the effector releases the expansion board after a successfully completed plugging of the plug-in region into the plug-in coupling.

7. The device according to claim 6, wherein the operations comprise controlling the first robot manipulator such that the effector executes force-controlled and/or impedance-controlled and/or admittance-controlled periodic rotational and/or tilting motions and/or translational motion patterns relative to the expansion board in order to release the expansion board.

8. The device according to claim 1, wherein the first interface is a second robot manipulator with a second effector, the second effector designed and configured to pick up, handle, and release the plug-in coupling.

9. A method of plugging a plug-in region of an expansion board into a plug-in coupling, the plug-in coupling having a slot, the slot having a depth T along a depth axis TA, a width B along a width axis BA, and a length L along a longitudinal axis LA, wherein the plug-in region of the expansion board is dimensioned such that it is capable of being plugged completely into the slot, and the depth axis TA and the longitudinal axis LA define a plug-in plane, the method comprising:

providing the plug-in coupling at a first interface;
providing the expansion board at a second interface;
open-loop or closed-loop controlling a first robot manipulator having an effector, the effector designed and configured to pick up, handle, and release the expansion board such that the first robot manipulator plugs the plug-in region of the expansion board into the plug-in coupling performing operations comprising:
picking up the expansion board at/from the second interface using the effector;
guiding the expansion board along a specified trajectory T with a specified target orientation $O_{target}(R_T)$ of the plug-in region to the plug-in coupling provided at the first interface, wherein $O_{target}(R_T)$ defines the target orientation of the plug-in region along the trajectory T for locations $R_T$ of the trajectory T; and carrying out force-controlled and/or impedance-controlled and/or admittance-controlled tilting motions of the plug-in region in the plug-in plane until a specified limit value condition G1 for a torque acting on the effector and/or a specified limit value condition G2 of a force acting on the effector is reached or exceeded and/or a provided force/torque signature, and/or a position/velocity/acceleration signature is reached or exceeded at the effector, indicating that the plugging of the plug-in region into the plug-in coupling is successfully completed within predefined tolerances.

10. The method according to claim 9, wherein the force-controlled and/or impedance-controlled and/or admittance-controlled tilting motions take place relative to the target orientation $O_{target}(R_T)$ of the plug-in region with maximum tilt angles in a range of ±2° to ±30°.

11. The method according to claim 10, wherein the maximum tilt angles are one or more of ±3°, ±5°, ±7, ±10°, ±15°, ±20°, ±25°.

12. The method according to claim 9, wherein the operations comprise controlling the first robot manipulator such that the effector releases the expansion board after a successfully completed plugging of the plug-in region into the plug-in coupling.

13. The method according to claim 12, wherein the operations comprise controlling the first robot manipulator such that the effector executes force-controlled and/or impedance-controlled and/or admittance-controlled periodic rotational and/or tilting motions and/or translational motion patterns relative to the expansion board in order to release the expansion board.

14. The method according to claim 9, wherein the plug-in coupling is a direct plug connector or card edge connector.

15. The method according to claim 9, wherein the plug-in region of the expansion board and the plug-in coupling have electrical contacts spatially assigned to one another, wherein the method comprises making corresponding electrical contact of the electrical contacts of the plug-in region and the plug-in coupling when the plug-in region is completely plugged into the slot-shaped plug-in coupling.

16. The method according to claim 9, wherein the first interface is a second robot manipulator with a second effector, the second effector designed and configured to pick up, handle, and release the plug-in coupling.

* * * * *